S. H. LEVEY.
GREASE GUN.
APPLICATION FILED NOV. 4, 1918.
1,296,298.
Patented Mar. 4, 1919.
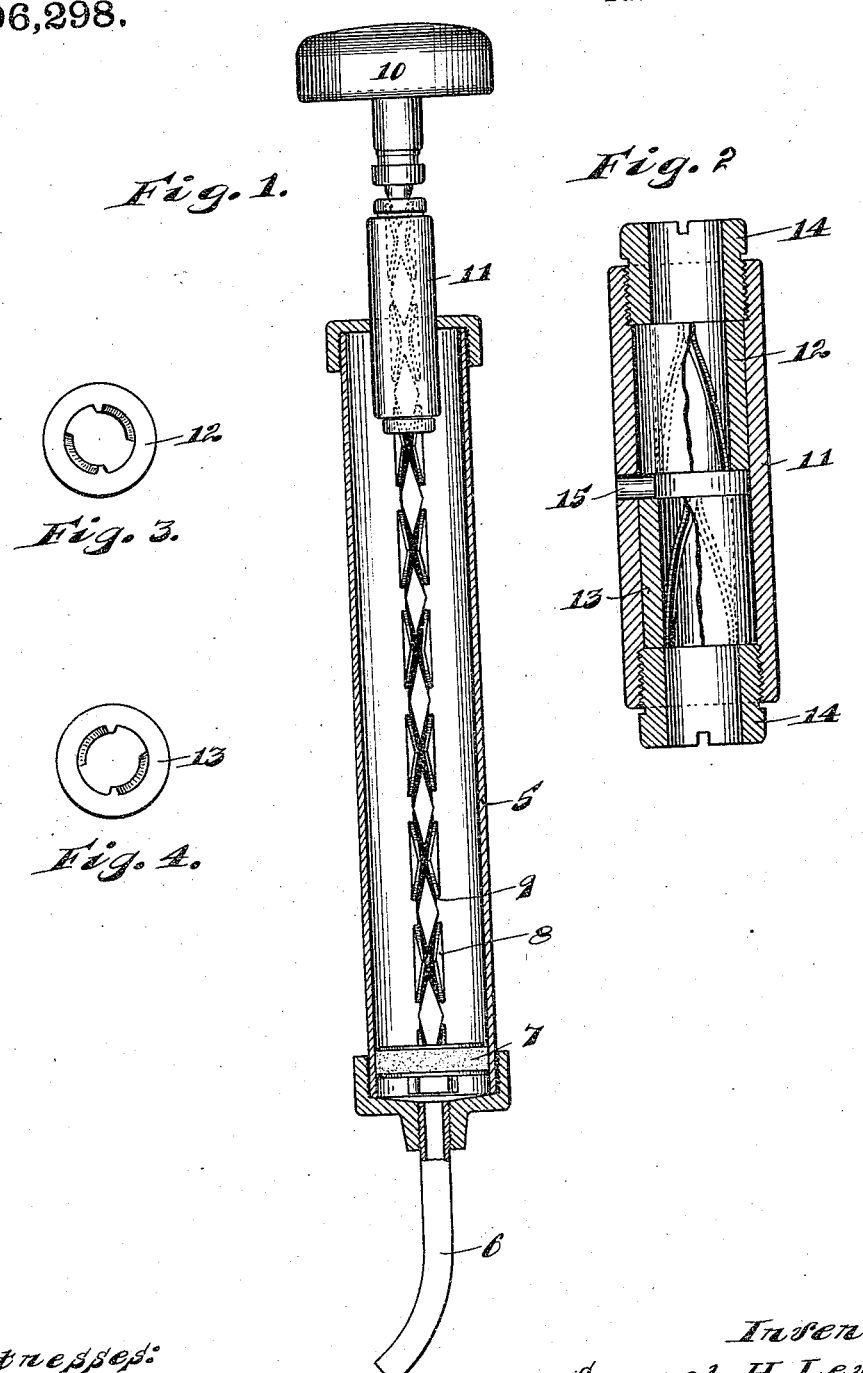

UNITED STATES PATENT OFFICE.

SAMUEL H. LEVEY, OF CHICAGO, ILLINOIS.

GREASE-GUN.

1,296,298.  Specification of Letters Patent.  Patented Mar. 4, 1919.

Application filed November 4, 1918. Serial No. 260,922.

*To all whom it may concern:*

Be it known that I, SAMUEL H. LEVEY, a citizen of the United States, and a resident of the city of Chicago, county of Cook, and State of Illinois, have invented certain new and useful Improvements in Grease-Guns, of which the following is a specification.

My invention relates to improvements in grease guns, and has for its object the provision of an improved construction of this character operating with little or no friction.

Other objects will appear hereinafter.

The invention consists in the combinations and arrangements of parts hereinafter described and claimed.

The invention will be best understood by reference to the accompanying drawings forming a part of this specification, and in which, Figure 1, is a longitudinal section of a grease gun embodying the invention, Fig. 2, an enlarged longitudinal section of a bearing block employed in the construction, Fig. 3, an end view of one of two bearing sleeves employed in the construction, and Fig. 4, a similar view of the other of said bearing sleeves.

The preferred form of construction, as illustrated in the drawings, comprises a cylinder 5 of any usual or desired construction, and adapted to contain the grease or other lubricant, said cylinder being provided with the usual discharge spout 6 at one end. A piston 7, of any usual or desired construction, operates within the cylinder 5 in the usual manner and is carried by a piston rod 8, as shown. The piston rod 8 is provided with oppositely disposed threads 9 having a very steep pitch, as shown, and an operating handle or knob 10 is provided at the outer end thereof.

The piston rod 9 reciprocates through a bearing block or cylinder 11 secured in the end of cylinder 5 opposite discharge spout 6. Within the bearing block 11 are arranged two rotatable sleeves 12 and 13, said sleeves being loose and freely rotatable in said bearing block, and a stop pin 15 being interposed between the ends thereof. Removable blocks 14 are arranged in each end of bearing block 11 to hold the bearing sleeves in position therein. The bearing sleeves 12 and 13 are threaded to engage the threads 9 of the piston rod 8, one bearing sleeve being threaded to engage one thread on said rod and the other bearing sleeve being threaded to engage the other thread, whereby said sleeves will be caused to rotate in opposite directions upon reciprocation of the piston rod and piston.

The device is used in the usual manner, being filled with grease or other heavy lubricant, which is discharged through spout 6 by manipulating the handle 10 in the usual manner. The bearing sleeves 12 and 13 rotating freely, as the piston rod 9 reciprocates, constitute a simple, durable and accurate guide for said piston rod and tend to relieve friction thereon.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. A grease gun comprising a cylinder having a discharge at one end thereof; a piston in said cylinder; a piston rod for said piston having opposite threads; and a bearing for said piston rod, consisting of two oppositely rotatable members surrounding said piston rod, one engaging one of said threads and the other the other thread, substantially as described.

2. A grease gun comprising a cylinder having a discharge at one end; a piston in said cylinder; a piston rod for said piston having opposite threads; a bearing cylinder secured in the opposite end of said cylinder, and through which said piston rod reciprocates; and two rotatable sleeves loosely imprisoned in said bearing block, one of said sleeves being threaded to fit one thread on said rod, and the other sleeve threaded to fit the other thread, substantially as described.

3. A grease gun comprising a cylinder having a discharge at one end; a piston in said cylinder; a piston rod for said piston having opposite threads; a bearing cylinder secured in the opposite end of said cylinder, and through which said piston rod reciprocates; two rotatable sleeves loosely imprisoned in said bearing block, one of said sleeves being threaded to fit one thread on said rod, and the other sleeve threaded to fit the other thread; a stop in said bearing block between said sleeves; and removable plugs at the ends of said bearing block holding said sleeves in place, substantially as described.

In testimony whereof I have signed my name to this specification in the presence of two subscribing witnesses.

SAMUEL H. LEVEY.

Witnesses:
 JOSEPH B. L. MASTER,
 HELEN F. LILLIS.

Copies of this patent may be obtained for five cents each, by addressing the "Commissioner of Patents, Washington, D. C."